(12) United States Patent
Wolfe et al.

(10) Patent No.: US 11,292,909 B2
(45) Date of Patent: Apr. 5, 2022

(54) EXTRUDABLE POLYMER COMPOSITION AND METHOD OF MAKING MOLDED ARTICLES UTILIZING THE SAME

(71) Applicant: Earth Renewable Technologies, Brevard, NC (US)

(72) Inventors: Thomas Jason Wolfe, Brevard, NC (US); Melvin Glenn Mitchell, Penrose, NC (US); James Etson Brandenburg, Brevard, NC (US)

(73) Assignee: Earth Renewable Technologies, Brevard, NC (US)

( * ) Notice: Subject to any disclaimer, the term of this patent is extended or adjusted under 35 U.S.C. 154(b) by 1343 days.

(21) Appl. No.: 15/152,087

(22) Filed: May 11, 2016

(65) Prior Publication Data

US 2016/0264776 A1      Sep. 15, 2016

Related U.S. Application Data

(63) Continuation-in-part of application No. 14/972,637, filed on Dec. 17, 2015, now abandoned.
(Continued)

(51) Int. Cl.
*B32B 1/02*          (2006.01)
*C08L 67/04*         (2006.01)
(Continued)

(52) U.S. Cl.
CPC ............... *C08L 67/04* (2013.01); *C08J 5/046* (2013.01); *C08L 2205/025* (2013.01);
(Continued)

(58) Field of Classification Search
CPC ........................ B32B 1/02; Y10T 428/1352
(Continued)

(56) References Cited

U.S. PATENT DOCUMENTS 4,649,572 A * 3/1987 Roessler .............. A41B 13/103
                                                  2/49.2
5,522,895 A    6/1996 Mikos
(Continued)

FOREIGN PATENT DOCUMENTS

CA    2762589 A1    6/2013
EP    2186846 A1    5/2010
(Continued)

OTHER PUBLICATIONS

Communication Pursuant to Article 94(3) EPC issued by the European Patent Office dated May 7, 2019 in European Patent Application No. 15826235.2 filed Dec. 18, 2015.
(Continued)

*Primary Examiner* — Marc A Patterson
(74) *Attorney, Agent, or Firm* — F. Michael Sajovec; Williams Mullen

(57) ABSTRACT

The present invention provides an extrudable polymer composition comprising a base polymer and a bicomponent fiber comprising a low melt temperature component selected from the group consisting of high density polyethylene (HDPE) and polylactic acid (PLA) and a high melt temperature component selected from the group consisting of PET, 100% PDLA, 100% PLLA or a 50/50 blend of 100% PDLA and 100% PLLA, and nylon wherein the base polymer has a melt temperature of about 20° C. to 40° C. lower than this high melt temperature component of the bicomponent fiber.

14 Claims, 6 Drawing Sheets

Related U.S. Application Data

(60) Provisional application No. 62/094,404, filed on Dec. 19, 2014, provisional application No. 62/143,972, filed on Apr. 7, 2015.

(51) Int. Cl.
  *C08J 5/04* (2006.01)
  *B32B 1/08* (2006.01)

(52) U.S. Cl.
  CPC ....... *C08L 2205/03* (2013.01); *C08L 2205/06* (2013.01); *C08L 2205/16* (2013.01); *C08L 2207/062* (2013.01)

(58) Field of Classification Search
  USPC ...................................................... 428/35.7
  See application file for complete search history.

(56) References Cited

U.S. PATENT DOCUMENTS

| | | | |
|---|---|---|---|
| 5,639,518 A | 6/1997 | Ando et al. | |
| 6,441,267 B1* | 8/2002 | Dugan .............. | A61F 13/15252 428/370 |
| 6,455,156 B1 | 9/2002 | Tanaka et al. | |
| 6,465,094 B1 | 10/2002 | Dugan | |
| 6,509,092 B1* | 1/2003 | Dugan .................. | A61L 15/225 428/364 |
| 7,160,977 B2 | 1/2007 | Hale et al. | |
| 7,214,414 B2 | 5/2007 | Khemani et al. | |
| 7,368,503 B2 | 5/2008 | Hale | |
| 7,670,545 B2 | 3/2010 | Bopp et al. | |
| 7,972,692 B2 | 7/2011 | Chakravarty et al. | |
| 8,063,129 B2 | 11/2011 | Parker et al. | |
| 8,114,939 B2 | 2/2012 | Babcock et al. | |
| 8,173,752 B2 | 5/2012 | De Vos | |
| 8,268,738 B2 | 9/2012 | McEneany et al. | |
| 8,304,490 B2 | 11/2012 | Kimura et al. | |
| 8,337,991 B2 | 12/2012 | Narita et al. | |
| 8,362,157 B2 | 1/2013 | Wakaki et al. | |
| 8,377,353 B2 | 2/2013 | Green et al. | |
| 8,431,218 B2 | 4/2013 | Kuo et al. | |
| 8,461,262 B2 | 6/2013 | McEneany et al. | |
| 8,512,852 B2 | 8/2013 | Shimizu et al. | |
| 8,513,147 B2 | 8/2013 | Gupta et al. | |
| 8,586,658 B2 | 11/2013 | Serizawa et al. | |
| 8,642,701 B2 | 2/2014 | Li et al. | |
| 8,759,446 B2 | 6/2014 | Li et al. | |
| 8,893,908 B2 | 11/2014 | Treece et al. | |
| 8,894,911 B2 | 11/2014 | Duranel et al. | |
| 8,946,330 B2 | 2/2015 | Bernreitner et al. | |
| 8,962,791 B2 | 2/2015 | Benson | |
| 2004/0031130 A1* | 2/2004 | Clarner .............. | A44B 18/0049 24/452 |
| 2007/0066731 A1 | 3/2007 | Tattum et al. | |
| 2007/0187655 A1 | 8/2007 | Wang et al. | |
| 2007/0187876 A1 | 8/2007 | Cink et al. | |
| 2007/0197985 A1 | 8/2007 | Miskie | |
| 2008/0086199 A1* | 4/2008 | Dave ....................... | A61L 27/18 623/1.42 |
| 2008/0207434 A1* | 8/2008 | Martinez .................. | C08K 3/04 502/62 |
| 2009/0068244 A1* | 3/2009 | Weber .................... | A61L 27/443 424/423 |
| 2009/0258559 A1* | 10/2009 | Anantharamaiah ...... | D04H 1/74 442/334 |
| 2010/0093888 A1 | 4/2010 | Endo et al. | |
| 2010/0152415 A1 | 6/2010 | Benson | |
| 2010/0221471 A1 | 9/2010 | Green et al. | |
| 2011/0213101 A1 | 9/2011 | Shi | |
| 2012/0040185 A1 | 2/2012 | Topolkaraev et al. | |
| 2013/0023608 A1* | 1/2013 | Kellett ..................... | D01F 1/10 524/52 |
| 2013/0131225 A1 | 5/2013 | Reid et al. | |
| 2014/0007108 A1 | 1/2014 | Zhang | |
| 2014/0087108 A1 | 3/2014 | Scalzo et al. | |
| 2014/0141189 A1 | 5/2014 | Li et al. | |

FOREIGN PATENT DOCUMENTS

| | | |
|---|---|---|
| WO | 2001010929 A1 | 2/2001 |
| WO | 2007107906 A1 | 9/2007 |
| WO | 2008067627 A3 | 6/2008 |
| WO | 2014147132 A1 | 9/2014 |

OTHER PUBLICATIONS

Final Office Action dated Jun. 10, 2019 in corresponding U.S. Appl. No. 14/972,637, filed Dec. 17, 2015.

Extended European Search Report dated Feb. 11, 2019 in European Patent Application No. 16797080.5 for Earth Renewable Technologies.

Fedorova, et al., "Strength Optimization of Thermally Bonded Spunbond Nonwovens," Journal of Engineered Fibers and Fabrics, 2007, vol. 2, Issue 1, pp. 38-48.

International Preliminary Search Report for PCT/US2016/032667, WIPO, Oct. 10, 2017.

International Preliminary Search Report for PCT/US2015/066562, WIPO, Jun. 20, 2017.

Anderson, et al., "Natureworks: Green Chemistry's Contribution to Biotechnology Innovation, Commercialization, and Strategic Positioning," 2009 American Chemical Society.

"PLA Processing Guide for Bicomponent Staple Fibers," NatureWorks, LLC, 2005, Minnetonka, MN.

"Highly Heat-resistant Bioplastic," Teijin, Mar. 23, 2015.

\* cited by examiner

EXTRUDABLE POLYMER COMPOSITION AND METHOD OF MAKING MOLDED ARTICLES UTILIZING THE SAME

CROSS-RELATED APPLICATION DATA

This application is a continuation-in-part to U.S. Ser. No. 14/972,637; filed Dec. 17, 2015, which claims the benefit of U.S. Provisional Application No. 62/094,404 filed Dec. 19, 2014 and claims the benefit of U.S. Provisional Application No. 62/143,972 filed Apr. 7, 2015, the disclosures of which are incorporated herein by reference in its entirety.

FIELD OF THE INVENTION

The present invention relates to an extrudable polymeric composition having improved physical properties such as melt viscosity, temperature stability, tensile strength, metallic properties, e.g.; ductility and malleability, higher moisture barrier and oxygen barrier properties, and impact resistance and a method of making molded articles therefrom. The polymeric composition may be derived from a wide variety of petroleum-based polymers, polymers derived from renewable resources, and recycled polymers.

BACKGROUND OF THE INVENTION

Molded articles are typically formed from various extrudable polymer compositions and then formed into exemplary articles of manufacture including bottles and other food containers, films, packaging, and the like. These molded articles are formed from a wide variety of polymers. One particular group of polymers that are of interest are polymers which are derived from renewable resources and are potentially biodegradable. Another group of polymers of interest are petroleum-based polymers including polypropylene (PP), polyethylene terephthalate (PET), polystyrene (PS), high density polyethylene (HDPE) and polyvinylchloride (PVC). Another group of polymers of interest are polymers recycled from either the above polymers derived from renewable resources or petroleum-based polymers.

Many of the polymers, particularly those derived from renewable resources have non-optimum physical properties which impact their use in various extruded articles of manufacture. For example, extrudable polymers formed from polylactic acid (PLA) derived from a renewable resource, e.g., corn, tend to be brittle and exhibit low toughness resulting in less than optimum impact strength. Therefore there continues to be a desire for improved physical properties in extrudable polymers and to overcome the process challenges relating to molding articles using such polymers.

SUMMARY OF THE INVENTION

To this end, the present invention provides an extrudable polymer composition comprising a base polymer and a bicomponent fiber comprising a low melt temperature component and a high melt temperature component. In one aspect of the invention, the bicomponent fiber is a so-called "island-in-the-sea" construction with the sea being the low melt temperature component and the island being the high melt temperature component.

In another aspect of the invention, the extrudable polymer composition has a heat deflection temperature of greater than about 52° C., often greater than about 70° C. and sometimes greater than about 100° C., and a melt temperature between about 153° C. and about 230° C.

The extrudable polymer composition may comprise about 60 to about 99.8 percent base polymer and about 0.1 to about 20 percent bicomponent fiber comprising an island-in-the-sea structure comprising a polymer selected from the group consisting of high density polyethylene (HDPE) or PLA as the sea and stereocomplex polylactic acid nylon, or polyethylene terephthalate (PET) as the island with the PET being petroleum-based or bio-based. Optionally, natural oil, fatty acid, fatty acid ester, wax or waxy esters, cyclodextrin, nanofibers, crystallinity agents, glass agents, starch-based rheology agents, colorants or pigments, and other additives may be included. The present invention also provides a method of forming molded articles from such an extrudable polymer composition.

In another aspect of the invention, provided is a container formed from the above extrudable polymer composition of the invention.

In still another aspect of the invention, provided is a closure, cap or lid for a container formed from an extrudable polymer composition of the invention.

In still another aspect of the invention, provided is a method of forming molded articles comprising forming a mixture of the extrudable polymer composition of the invention, drying the mixture to a moisture level of less than about 150 ppm, often less than about 100 ppm and sometimes less than about 50 ppm of water, extruding the dried mixture, and molding the extruded composition into an article of manufacture using molding techniques such as blow molding, injection molding, thermoforming and the like. In one embodiment, injection stretch blow molding (ISBM) is used.

DETAILED DESCRIPTION OF EMBODIMENTS OF THE INVENTION

Figure 1:
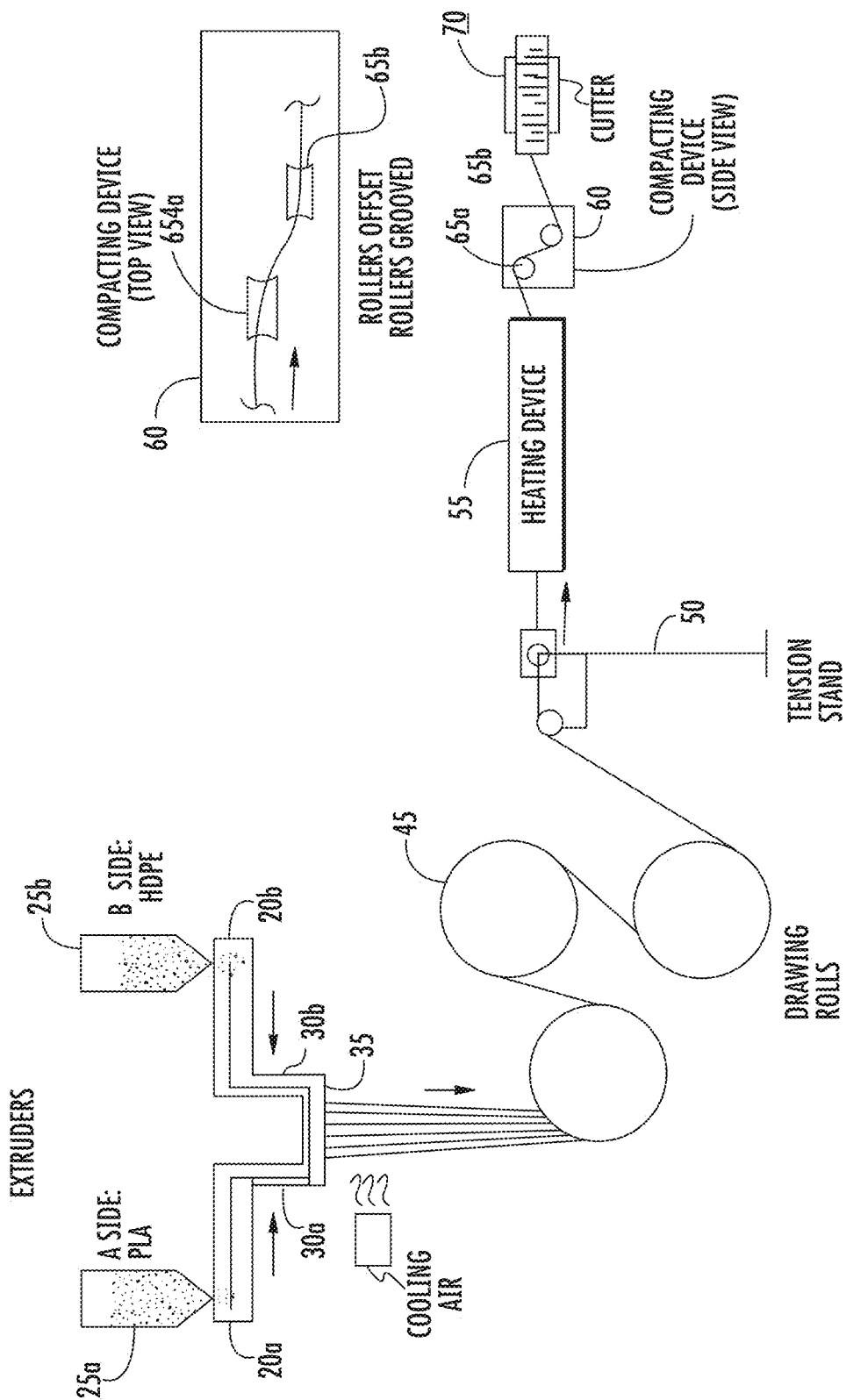
FIG. 1 is a schematic illustration of a method of forming the biocomponent fibers of one embodiment of the present invention.

The foregoing and other aspects of the present invention will now be described in more detail with respect to the description and methodologies provided herein. It should be appreciated that the invention may be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a,"

"an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. When a range is employed (e.g., a range from x to y) it is it meant that the measurable value is a range from about x to about y, or any range therein, such as about $x_1$ to about $y_1$, etc. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

It will be understood that although the terms "first," "second," "third," "a)," "b)," and "c)," etc. may be used herein to describe various elements of the invention should not necessarily be limited by these terms. These terms are only used to distinguish one element of the invention from another. Thus, a first element discussed below could be termed an element aspect, and similarly, a third without departing from the teachings of the present invention. Thus, the terms "first," "second," "third," "a)," "b)," and "c)," etc. are not intended to necessarily convey a sequence or other hierarchy to the associated elements but are used for identification purposes only. The sequence of operations (or steps) is not necessarily limited to the order presented in the claims and/or drawings unless specifically indicated otherwise.

All patents, patent applications and publications referred to herein are incorporated by reference in their entirety. In the event of conflicting terminology, the present specification is controlling.

The embodiments described in one aspect of the present invention are not limited to the aspect described. The embodiments may also be applied to a different aspect of the invention as long as the embodiments do not prevent these aspects of the invention from operating for its intended purpose.

As discussed above, the present invention provides an extrudable polymer composition comprising a base polymer, bicomponent fibers having a low melt temperature component and a high melt temperature component, optionally a natural oil, fatty acid, fatty acid ester, wax or waxy ester, and optionally cyclodextrin. In another embodiment, the extrudable polymer composition may include nanofibers. In yet another embodiment, the extrudable polymer composition may include a crystallinity agent or a crystallinity retarder. In another embodiment, the extrudable polymer composition may include a rheology modifier. In another embodiment, the extrudable polymer composition may include a colorant, and often a naturally-derived colorant. In another embodiment, the extrudable polymer composition may include a gloss agent. In yet another embodiment, the extrudable polymer composition may include a starch-based rheology agent. In another embodiment, the extrudable polymer composition may include lignin or modified lignin. Various combinations of these embodiments and additional additives are also contemplated by the present invention.

The extrudable polymer composition of the invention includes a base polymer. The based polymer may be petroleum-based. For example, in one embodiment, the base polymer may be only petroleum-based polymer having a melt temperature of at least 20° C. to 40° C. lower than the high melt temperature component of the bicomponent fiber. Suitable base polymers may include acetal, acrylic, acrylonitrile butadiene styrene, cellulose acetate, cellulose butyrate cellulose propionate, ethylene vinyl acetate, nylon, polybutylene terephthalate, polycyclohexylene dimethylene terephthalate, polyether ether ketone, polyethylene terephthalate, polycarbonate, polyetherimide, polyethylene, polypropylene, polystyrene, polyamide-imide, polyarylate, polytetrafluoroethane, polysulfonic poly (p-phenyleneoxide), polyvinyl chloride and mixtures, blends and copolymers thereof.

In another embodiment, the base polymer may be a polymer derived from a renewable resource such as polylactic acid (PLA), bio HDPE or bio PET. In another embodiment, the base polymer may be derived from a recycled polymer or polymers.

For example, an extrudable PLA composition of the invention may be formulated so as to substantially mimic the properties of non-biodegradable conventional polymers derived from non-renewable resources (petroleum-based polymers). In one embodiment, the extrudable PLA composition has an HDT of greater than about 52° C., often greater than about 70° C. and sometimes greater than about 100° C., and a melt temperature between about 153° C. and about 230° C. The PLA may be copolymerized with other polymers or copolymers which may or may not be biodegradable and/or may or may not be naturally-derived or may or may not be derived from a recycled polymer. Exemplary polymers or copolymers may include polypropylene (PP), high density polyethylene (HDPE), aromatic/aliphatic polyesters, aliphatic polyesteramide polymers, polycaprolactones, polyesters, polyurethanes derived from aliphatic polyols, polyamides, polyethylene terephthalate (PET), polystyrene (PS), polyvinylchloride (PVC), and cellulose esters either in naturally-based and/or biodegradable form or not.

The extrudable polymer composition further includes a bicomponent fiber. Although in one aspect a bicomponent fiber is utilized, the fiber may be a multicomponent fiber having two or more components. Moreover such fiber is typically a microfiber having a fineness of about less than about 10 d/f and often less than about 5 d/f. In operation, the fibers are extruded from separate extruders. The individual polymer type segments within the bicomponent fiber have a fineness of about less than about 10 microns and often less than about 5 microns. The polymers are arranged in substantially constantly positioned distinct zones across the cross-section of the fibers. The components may be arranged in any desired configuration and/or geometry, such as sheath-core, side-by-side, pie, island in the sea, and so forth. Various methods for forming bicomponent and multicomponent fibers are described in, for example, U.S. Pat. No. 4,789,592 to Taniguchi et al., U.S. Pat. No. 5,336,552 to Strack et al., U.S. Pat. No. 5,108,820 to Kaneko et al., U.S. Pat. No. 4,795,668 to Kruege et al., U.S. Pat. No. 5,382,400 to Pike et al, U.S. Pat. No. 6,200,669 to Marmon et al, and U.S. Pat. No. 8,710,172 to Wang et al. Bicomponent or multicomponent fibers having various irregular shapes may also be formed, such as described in U.S. Pat. No. 5,277,976 to Hogle et al., U.S. Pat. No. 5,162,074 to Hills, U.S. Pat. No. 5,466,410 to Hills, U.S. Pat. No. 5,069,970 to Largman et al, and U.S. Pat. No. 5,057,368 to Largman et al. An example of a bicomponent fiber is Cyphrex™ fibers available from Eastman Chemicals.

In one aspect of the invention, the bicomponent fiber comprises a low melt temperature "sea" component and a high melt temperature "island" component. The low melt temperature sea component in one embodiment may be "bioHDPE", i.e., a naturally-derived, non-petroleum based high density polyethylene (HDPE) available from Braskem (Brazil). In another embodiment, the low melt temperature sea component may be a naturally-derived PLA such as 7001D available from NatureWorks. The sea component may also be a petroleum based polymer such as nylon or polyethylene terephthalate or may be bio-PET.

The high melt "island" component may be used to raise the thermal stability of the extrudable polymer composition. The island component may also improve metallic-type properties such as ductility or malleability. In one embodiment, the high melt temperature island component is a naturally-derived PET (bioPET) available from Toyota Tsusho. In another embodiment, the island component comprises 100% poly(L-lactic acid) (PLLA) or 100% poly(D-lactic acid) (PDLA). In another embodiment, the island component comprises a polylactic stereocomplex composition comprising about 20% to about 80% PLLA and about 80% to about 20% PDLA. In one embodiment, the stereocomplex-PLA composition is 50% PLLA and 50% PDLA, i.e., a 50/50 blend of PLLA and PDLA. Suitable stereocomplex PLLA and PDLA and blends thereof are available from Corbion (Netherlands) and Teijin (Japan). Such compositions are described, for example, in PCT Publication WO 2014/147132 A1, U.S. Pat. No. 8,304,490 B2 and U.S. Pat. No. 8,962,791 B2. These high melt temperature stereocomplex PLA compositions typically have a melt temperature greater than about 200° C. and often greater than about 220° C. The base polymer preferably has a melt temperature of about 20° C. to 40° C. lower than the island component of the bicomponent fiber.

In another embodiment, lignin and chemically modified lignin may be blended with the PLA to increase melt temperature. In one embodiment, the bicomponent fibers may comprise about 0.1% to about 10% by weight of the overall extrudable polymer composition. The bicomponent fiber may function as a carrier for the introduction of other components into the extrudable polymer composition.

Referring to FIG. 1, one embodiment of a method of forming bicomponent fibers is illustrated. The illustrated embodiment shows a continuous line of forming the fibers noting that the method could involve spinning the fibers, placing on a spool and at a later time drawings and cutting the fibers on a separate line. In general, the components of the bicomponent fiber are extruded through a spinneret, quenched, and drawn into a vertical passage of a fiber drawn unit.

The high melt component (e.g., stereocomplex PLA) and the low melt component (e.g., HDPE) are fed into extruders 20a and 20b from hoppers 25a and 25b. The extruder is heated to a temperature above that of the low melt component and may be heated to greater than 135° C. if HDPE is used, for example. The high and low melt components are fed through conduit 30a, 30b to a spinneret 35. Such spinnerets for extruding bicomponent fibers are well known to those skilled in the art. For example, various patterns of openings in the spinneret can be used to create various flow patterns of the high and low melt components. A quench blower 40 to provide cooling air may be positioned to one side of the filaments as shown or may be positioned on both sides.

The filaments are then passed from drawing rolls 45, placed under tension using a tension stand 50 and delivered to a heating device 55 to heat the fiber above the softening point of the low melt component so that sufficient melt occurs to act as a bonding agent that holds the high melt fibers together.

The fibers are then compacted using compaction device 60. In one embodiment, this is accomplished by creation of a small twist in the tow band of the fully oriented yarn using a series of rollers 65a, 65b, in one embodiment grooved rollers. Such a twist aids in applying pressure to create a semi-permanent bond of the low melt component after heating to its softening point. In one embodiment the 65a, 65b are slightly offset from each other such that the path of the tow passing through the two grooved rolls creates two distinct turns within a distance of less than eight inches. The first turn of the tow should produce an angle of about 140-170 degrees as measured to the outside of the original path of the tow. The second turn should produce an angle of approximately equal angularity to the first but turning in the opposite direction as measured to the inside of the new path of the tow after the second turn. The sharper the angle, the tighter the twist and adjustment of the angle will result in higher efficiency of compaction.

Figure 2:
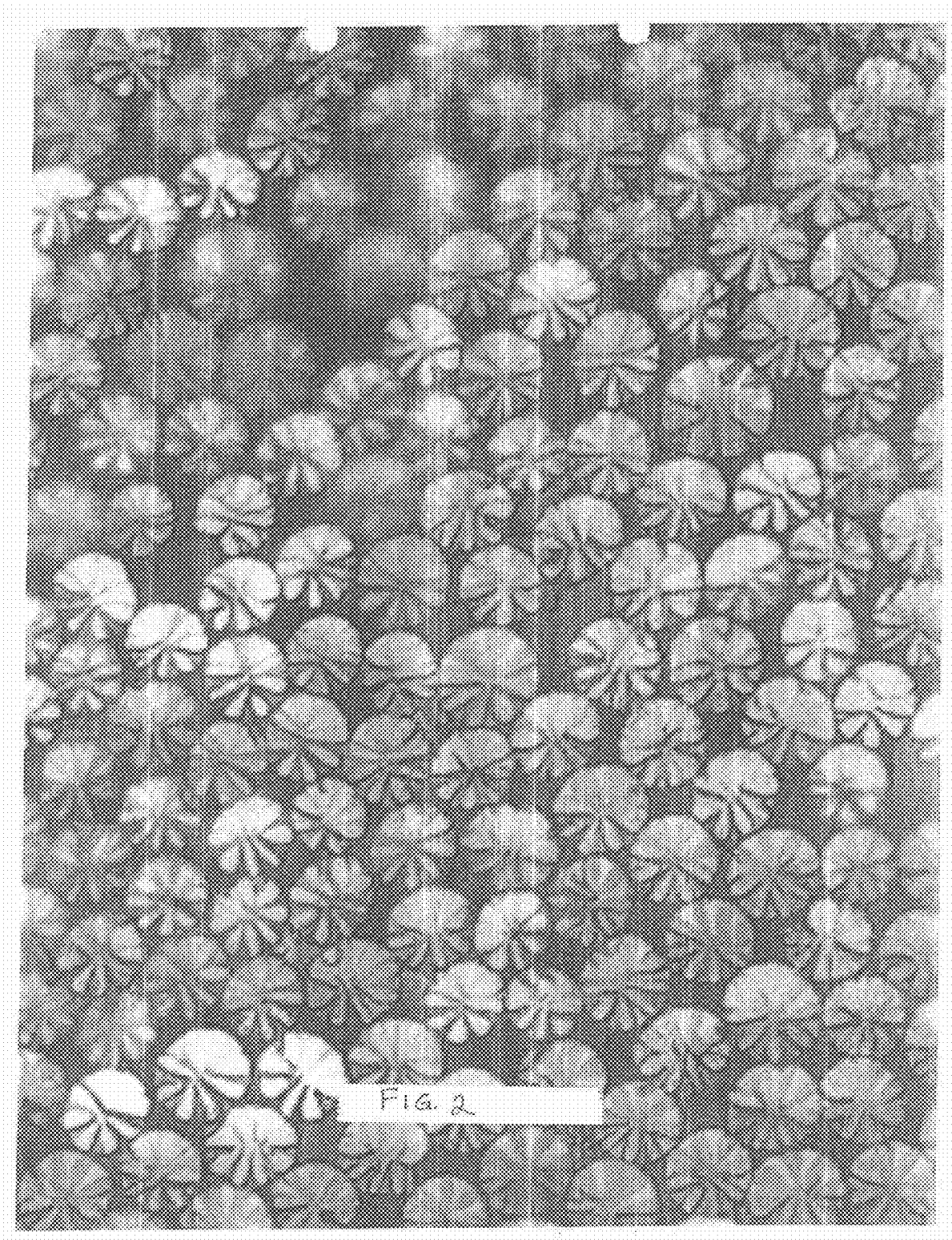
FIG. 2 is a cross-sectional view of an exemplary biocomponent fiber.

After compaction, an optional lubrication stand, including a kiss roll (not shown) may be used to add 0.1% to 5.0% of a lubricant to the fiber prior to cutting. The bicomponent fiber may be cut using a cutter 70 to a length of not greater than 6 mm, sometimes not greater than 3 mm and often not greater than 1.5 mm. After cutting, the fiber may be dried to less than 100 ppm. Referring to FIG. 2, an exemplary sixteen pie wedge island-in-the-sea bicomponent fiber is shown.

In another embodiment, the filaments of the individually spun yarns may be spun simultaneously into a larger type of monofilament of a uniform diameter and equal in denier to the combination of up to 144 individual yarns composed of 3 denier-per-filament by designing the spin pack such that the cross section of the monofilament may contain many multiples of the individual filaments. For example, instead of a spin die containing 288 filaments that when wound together create a 864 denier (DEN) yarn wound onto a bobbin. The individual monofilament would be 864 DEN. The result would be a single filament, i.e. a monofilament, with a cross section containing 4,608 pie shapes in a roughly concentric formation, but formed to alternate high melt and low melt components within each distinct sixteen pie segment shape within its whole. To accommodate this design, the monofilament may be spun in from a horizontally oriented spin die instead of a vertically oriented spin die. The orientation of the spin die to horizontal will allow the filament to be quenched immediately in either a trough type water bath or via an underwater chopper, such as Gala Underwater Pelletizer type chopper.

In another embodiment, after heating the fiber in the heating device 55, the compaction step may be done at a later time as a separate non-continuous process.

The extrudable polymer composition may include natural oil, fatty acid, fatty acid ester, wax or waxy ester. In one embodiment, the natural oil, fatty acid, fatty acid ester, wax or waxy ester is coated on pellets of the polymer using agitation. A blend or mixture of the natural oil, fatty acid, wax or waxy ester may be used.

In an embodiment, the extrudable polymer composition may include a natural oil. Suitable natural oils include lard, beef tallow, fish oil, coffee oil, soy bean oil, safflower oil, tung oil, tall oil, calendula, rapeseed oil, peanut oil, linseed oil, sesame oil, grape seed oil, olive oil, jojoba oil, dehydrated castor oil, tallow oil, sunflower oil, cottonseed oil, corn oil, canola oil, orange oil, and mixtures thereof.

Suitable waxes include naturally-derived waxes and waxy esters may include without limitation, bees wax, plant-based waxes, bird waxes, non-bee insect waxes, and microbial waxes. Waxy esters also may be used. As utilized herein, the term 'waxy esters' generally refers to esters of long-chain fatty alcohols with long-chain fatty acids. Chain lengths of the fatty alcohol and fatty acid components of a waxy ester may vary, though in general, a waxy ester may include greater than about 20 carbons total. Waxy esters may generally exhibit a higher melting point than that of fats and oils. For instance, waxy esters may generally exhibit a melting point greater than about 45° C. Additionally, waxy esters encompassed herein include any waxy ester including saturated or unsaturated, branched or straight chained, and so forth. Waxes have been found to provide barrier properties, such as reduced Oxygen Transfer and Water Vapor Transfer.

Suitable fatty esters or fatty acid esters are the polymerized product of an unsaturated higher fatty acid reacted with an alcohol. Exemplary high fatty esters include oleic ester, linoleic ester, resinoleic ester, lauric ester, myristic ester, stearic ester, palmitic ester, eicosanoic ester, eleacostearic ester, and the like, and mixtures thereof.

These esters may be combined with suitable oils, as well as various esters derived from carboxylic acids may be included to act as plasticizers for the polymer. Exemplary carboxylic acids include acetic, citric, tartaric, lactic, formic, oxalic and benzoic acid. Furthermore these acids may be reacted with ethanol to make an acid ethyl ester, such as ethyl acetate, ethyl lactate, monoethyl citrate, diethyl citrate, triethyl citrate (TEC). Most naturally occurring fats and oils are the fatty acid esters of glycerol.

The extrudable polymer composition may include cyclodextrin. Cyclodextrin (CD) is cyclic oligomers of glucose which typically contain 6, 7, or 8 glucose monomers joined by α-1,4 linkages. These oligomers are commonly called α-cyclodextrin (α-CD), β-cyclodextrin (β-CD, or BCD), and γ-cyclodextrin (γ-CD), respectively. Higher oligomers containing up to 12 glucose monomers are known but their preparation is more difficult. Each glucose unit has three hydroxyls available at the 2, 3, and 6 positions. Hence, α-CD has 18 hydroxyls or 18 substitution sites available and may have a maximum degree of substitution (DS) of 18. Similarly, β-CD and γ-CD have a maximum DS of 21 and 24 respectively. The DS is often expressed as the average DS, which is the number of substituents divided by the number of glucose monomers in the cyclodextrin. For example, a fully acylated β-CD would have a DS of 21 or an average DS of 3. In terms of nomenclature, this derivative is named heptakis(2,3,6-tri-O-acetyl)-β-cyclodextrin which is typically shortened to triacetyl-β-cyclodextrin.

In another embodiment, the extrudable polymer composition may include nanofibers. Suitable nanofibers include glass fibers, i.e., fibers derived from silica and have a diameter of about 1 μm or less using a SEM measurement and typically have a length of about 65 to about 650 nm. Suitable nanofibers are available from Johns Manville as Micro-Stand™ 106-475. Alternatively nanofibers derived from treated (refined) cellulose may be used. For example, wood pulp could be treated with a natural oil and wherein the pulp and oil may be mechanically refined in a pulp type refiner to develop fibrils which causes the solution to form a gel. Biodegradable wood fibers such as bleached or unbleached hardwood and softwood kraft pulps may be used as the pulp. High fiber count northern hardwoods such as Aspen and tropical hardwoods such as eucalyptus are of particular interest. Also nonwood fibers may be used such as flax, hemp, esparato, cotton, kenaf, bamboo, abaca, rice straw, or other fibers derived from plants. Alternatively a renewable and biodegradable source of cellulose fibers, particularly those having a microfiber structure, for example, switch grass may be used.

In another embodiment, the extrudable polymer composition may include a crystallinity agent. Examples of crystallinity agents include, but are not limited to talc, kaolin, mica, bentonite clay, calcium carbonate, titanium dioxide and aluminum oxide.

In another embodiment, the extrudable polymer composition may include a starch-based melt rheology modifier. Suitable starches are those produced by plants and include cereal grains (corn, rice, sorghum, etc.), potatoes, arrowroot, tapioca and sweet potato.

In another embodiment, the extrudable polymer composition may include one or more crystallinity retarders. Examples of crystallinity retarders include, but are not limited to, xanthan gum, guar gum, and locust bean gum.

In another embodiment, colorants to provide the common colors associated with pharmaceutical and nutraceutical containers, i.e., white, amber, and green, may be included. In an embodiment wherein a white container is desired, titanium dioxide may be included preferably with safflower oil as the natural oil. Typically the amount of colorant present is 0 to 67% depending on the type of extruder used, and may preferably be about 0.1 to 3% based on the overall weight of the extrudable polymer composition. In an embodiment wherein a green container is desired, sodium copper chlorophyllin or a food grade analine powder available from DDW The Color House, may be used as the colorant. In an embodiment wherein an amber container is desired, a blend of 0.019 to 0.021% food grade black, 0.008 to 0.010% blue, 0.104 to 0.106% red, and 0.063 to 0.065% yellow colorants available from Keystone, Chicago, Ill. may be used.

Agents to provide additional water and oxygen barrier properties may be included. Exemplary water and oxygen barrier agents include candelilla wax, beeswax, and other waxes. Preferably such a barrier agent is derived from a renewable source.

Gloss agents to provide an aesthetically pleasing gloss to the container may be included. Exemplary gloss agents include shea butter and nut oils such as Brazil nut oil. Preferably such a gloss agent is derived from a renewable source.

In an alternate embodiment, the extrudable polymer composition may include lignin or modified lignin to improve temperature stability and impact resistance. Such lignin or modified lignin in one embodiment is added to the bicomponent fiber such that the bicomponent fiber acts as a carrier. The lignin may be lignin isolated from a biomass that has not been exposed to harsh reaction conditions and has not been denatured and/or degraded by the isolation process such as described in U.S. Ser. No. 14/619,451. Such a lignin may be modified by esterification or transesterification to provide an acetylated or ethylated lignin such as lignin acetule or lignin ethylate. In such an embodiment, a water dispersible polyester may be included.

Other additives may include other natural or synthetic plasticizers such as impact modifiers, fiber reinforcement other than nanofibers, antioxidants, antimicrobials, fillers, UV stabilizers, glass transition temperature modifiers, melt temperature modifiers and heat deflection temperature modifiers. Of particular interest as fillers are biodegradable nonwood fibers such as those used for the nanofibers, and include kenaf, cotton, flax, esparto, hemp, abaca or various fiberous herbs.

Prior to extrusion, the extrudable polymer composition is dried to remove substantially all of the moisture, i.e., there is less than about 0.02% water, and often less than about 0.01% water. Typically, desiccant drying is utilized.

In one embodiment, a master batch is used. By utilizing a master batch, the often more expensive additives may be first compounded in larger percentage amounts into the master batch and then added to pure or virgin polymer. Such use of a master batch may be used to incorporate additives more cost effectively, for example, those that improve properties like barrier properties, flexibility properties, HDT properties and melt flow index, and the like. Another example is that a master batch may be formulated so that the consumer has the capability of customizing the color of the article of manufacture. For example, some amount of the base colorant (e.g., green colorant) may be added to pure base polymer, then the colorant/base resin composition and the master batch with smaller amounts of the green colorant(s) are combined to result in the end extrudable polymer composition having the desired color. The smaller amounts of green colorant(s) in the master batch may be selected to arrive at the desired hue or shade of the desired color.

For illustrative purposes, an extrudable polymer composition for a closure or cap having properties similar to a PET container may be made. The extrudable composition may comprise a) 50 to 99% base polymer; b) about 0.1% to about 20% bicomponent fiber; c) about 0.1 to about 8% natural oil or natural wax; d) about 0.01 to about 5% nanofibers; e) about 0.05 to about 8% BCD; f) about 0 to about 10% crystallinity agent; g) about 0 to about 1% starch-based melt rheology modifier; h) about 0 to about 1% polysaccharide crystallinity retarder; i) about 0 to about 5% colorant; j) about 0 to about 1% plasticizer; k) about 0 to about 1% gloss agent; about 0 to about 30% natural fiber, and l) about 0 to about 4% barrier agent. A master batch comprising the base polymer, natural oil, bicomponent fibers, cyclodextrin, crystallinity agent, pigment and a crystallinity retarder may be formed and blended with the bicomponent fiber which may or may not also include the additives.

The extrudable polymer composition may then be formed into an article of manufacture. For example, the process may include thermoforming, extrusion molding, injection molding or blow molding the composition in melted form. For purposes of the present disclosure, injection molding processes include any molding process in which a polymeric melt or a monomeric or oligomeric solution is forced under pressure, for instance with a ram injector or a reciprocating screw, into a mold where it is shaped and cured. Blow molding processes may include any method in which the extrudable polymer composition may be shaped with the use of a fluid and then cured to form a product. Blow molding processes may include extrusion blow molding, injection blow molding, and injection stretch blow molding, as desired. Extrusion molding methods include those in which the extrudable polymer composition is extruded from a die under pressure and cured to form the final product, e.g., a film or a fiber. Single screw or twin screw extruders may be used, the selection of which and the amounts of each component being varied depending on the extruder will be within the skill of one in the art.

With respect to extruding the extrudable polymer composition, ISBM processes may be divided into two main types. One type is a one-step process, in which the preform is molded, conditioned, and then transferred to the stretch blow molding operation before the preform is cooled below its softening temperature. The other main type of ISBM process is a two-step process in which the preform is prepared ahead of time. In this case, the preform is reheated to conduct the stretch blow molding step. The two-step process has the advantage of faster cycle times, as the stretch blow molding step does not depend on the slower injection molding operation to be completed. However, the two-step process presents the problem of reheating the preform to the stretch blow molding temperature. This is usually done using infrared heating, which provides radiant energy to the outside of the preform. It is sometimes difficult to heat the preform uniformly using this technique and unless done carefully, a large temperature gradient can exist from the outside of the preform to the center. Conditions usually must be selected carefully to heat the interior of the preform to a suitable molding temperature without overheating the outside. The result is that the two-step process usually has a smaller operating window than the one-step process. The selection of the extrudable polymer composition as described herein has been found to broaden this processing window.

In the two-step process, the preform is generally heated to a temperature at which the preform becomes soft enough to be stretched and blown. This temperature is generally above the glass transition temperature ($T_g$) of the extrudable polymer composition. A preferred temperature is from about 70° C. to about 120° C. and a more preferred temperature is from about 80° C. to about 100° C. In order to help obtain a more uniform temperature gradient across the preform, the preform may be maintained at the aforementioned temperatures for a short period to allow the temperature to equilibrate.

Mold temperatures in the two-step process are generally below the glass transition temperature of the extrudable polymer composition, such as from about 30° C. to about 60° C., especially from about 35° C. to about 55° C. Sections of the mold such as the base where a greater wall thickness is desired may be maintained at even lower temperatures, such as from about 0 to about 35° C., especially from about 5° C. to about 20° C.

In the one-step process, the preform from the injection molding process is transferred to the stretch blow molding step, while the preform is at a temperature at which the preform becomes soft enough to be stretched and blown, again preferably above the $T_g$ of the resin, such as from about 80 to about 120° C., especially from about 80 to about 110° C. The preform may be held at that temperature for a short period prior to molding to allow it to equilibrate at that temperature. The mold temperature in the one-step process may be above or below the $T_g$ of the base polymer. In the so-called "cold mold" process, mold temperatures are similar to those used in the two-step process. In the "hot mold" process, the mold temperature is maintained somewhat above the $T_g$ of the resin, such as from about 65 to about 100° C. In the "hot mold" process, the molded part may be held in the mold under pressure for a short period after the molding is completed to allow the resin to develop additional crystallinity (heat setting). The heat setting tends to improve the dimensional stability and heat resistance of the molded container while still maintaining good clarity. Heat setting processes may also be used in the two-step process, but are used less often in that case because the heat setting process tends to increase cycle times.

In one embodiment, the resulting molded article is a container. The term "container" as used in this specification and the appended claims is intended to include, but is not limited to, any article, receptacle, or vessel utilized for storing, dispensing, packaging, portioning, or shipping various types of products or objects (including but not limited to, food and beverage products). Specific examples of such containers include boxes, cups, "clam shells", jars, bottles, plates, bowls, trays, cartons, cases, crates, cereal boxes, frozen food boxes, milk cartons, carriers for beverage containers, dishes, egg cartons, lids, straws, envelopes, stacks, bags, baggies, or other types of holders. Containment products and other products used in conjunction with containers are also intended to be included within the term "container."

In a further embodiment, the extrudable polymer composition as disclosed herein may be formed as a container, and in one particular embodiment, a container suitable for holding and protecting environmentally sensitive materials such as biologically active materials including pharmaceuticals and nutraceuticals. For purposes of the present disclosure, the term 'pharmaceutical' is herein defined to encompass materials regulated by the United States government including, for example, drugs and other biologics. For purposes of the present disclosure, the term 'nutraceutical' is herein defined to refer to biologically active agents that are not necessarily regulated by the United States government including, for example, vitamins, dietary supplements, and the like.

In yet another embodiment, the molded article is a containment product that is a closure. The term "closure" as used in the specification and the appended claims is intended to include, but is not limited to, any containment product such as caps, lids, liners, partitions, wrappers, films, cushioning materials, and any other product used in packaging, storing, shipping, portioning, serving, or dispensing an object within a container. Examples of closures include, but are not limited to, screw caps, snap on caps, tamper-resistant, tamper-evident and child-resistant closures or caps.

For illustrative purposes, an extrudable PLA composition for a container having properties similar to a PET container may be made. A master batch comprising partially crystalline or crystalline PLA, bicomponent fibers, a natural oil, nanofibers, cyclodextrin, pigment, and a crystallinity agent is formed by mixing the oil and nanofibers, adding the bicomponent fibers, oil and nanofibers to the PLA with the other constituents, then combining with a mixture of cyclodextrin and starch crystallinity retarder, followed by an addition of a crystallinity agent and then agitation and drying. A colorant/pigment may be added to the master batch. Alternatively, a separate batch of crystalline PLA and pigment may be made and the master batch and this separate batch then fed together.

An exemplary formulation for a container may comprise about 85% to about 95% polymer (e.g., crystalline polylactic acid including 0.01% to about 30% PLLA), about 0.05% to about 8% cyclodextrin, about 0.1 to about 8% natural oil or wax, 1 to 15% bicomponent fiber comprising 25% to 35% naturally-based HDPE sea and 65% to 75% 50/50 PLLA/PDLA island, about 0.01 to about 1% starch-based rheology modifier, about 0.1% to about 1% gloss agent, about 0 to 30% natural fibers, and about 0.01 to about 8% colorant.

Formed articles and structures incorporating the extrudable polymer composition may include laminates including the disclosed composite materials as one or more layers of the laminate. For example, a laminate structure may include one or more layers formed of composite materials as herein described so as to provide particular inhibitory agents at predetermined locations in the laminate structure. Barrier properties may also be increased by using a wax coating inside or outside of the vessel being utilized for spraying or dipping.

Alternatively the various extrusion, blow molding, injection molding, casting or melt processes known to those skilled in the art may be used to form films or sheets. Exemplary articles of manufacture include articles used to wrap, or otherwise package food or various other solid articles. The films or sheets may have a wide variety of thicknesses, and other properties such as stiffness, breathability, temperature stability and the like which may be changed based on the desired end product and article to be packaged. Exemplary techniques for providing films or sheets are described, for example, in U.S. Patent Publication Nos. 2005/0112352, 2005/0182196, and 2007/0116909, and U.S. Pat. No. 6,291,597, the disclosures of which are incorporated herein by reference in their entireties.

In an exemplary embodiment, a laminate may include an impermeable polymeric layer on a surface of the structure, e.g., on the interior surface of a container (e.g., bottle or jar) or package (e.g., blister pack for pills). In one particular embodiment, an extruded film formed from the extrudable polymer composition may form one or more layers of such a laminate structure. For example, an impermeable polymer-based film may form an interior layer of a container so as to, for instance, prevent leakage, degradation or evaporation of liquids that may be stored in the container. Such an embodiment may be particularly useful when considering the storage of alcohol-based liquids, for instance, nutraceuticals in the form of alcohol-based extracts or tinctures.

The following examples will serve to further exemplify the nature of the invention but should not be construed as a limitation on the scope thereof, which is defined by the appended claims.

EXAMPLES

Example 1

An extrudable polymer composition using PLA as the base polymer is formed:
93.5 percent PLA
2.5 percent bicomponent fiber (50% PDLA/50% PLLA)
1.2 percent safflower oil
0.2 percent arrowroot
0.4 percent BCD
2 percent titanium dioxide
0.1 percent shea butter
0.1 percent candelilla wax.

Figure 3:
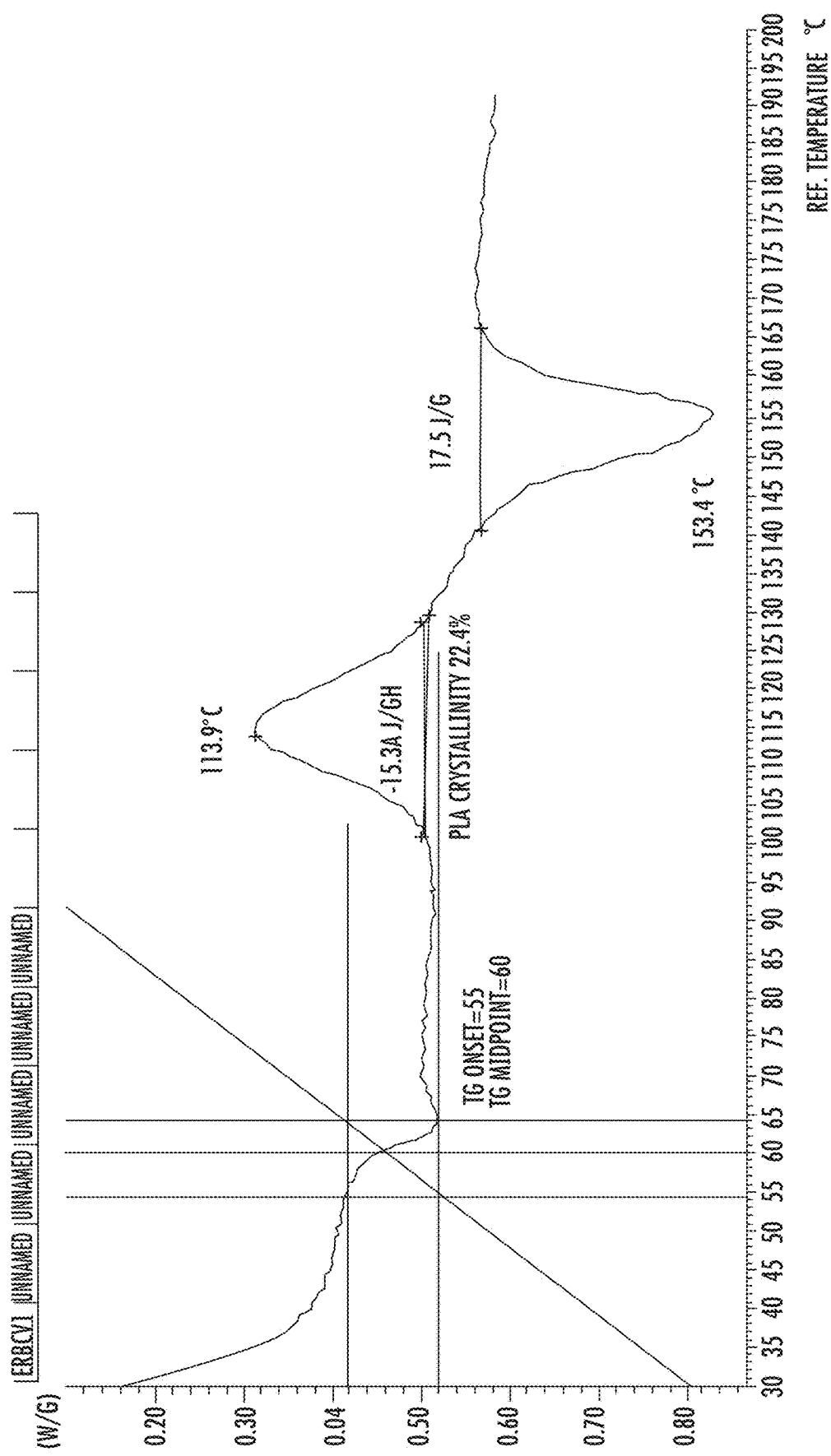
FIG. 3 is a first pass DSC chart corresponding to Example 1.
Figure 4:
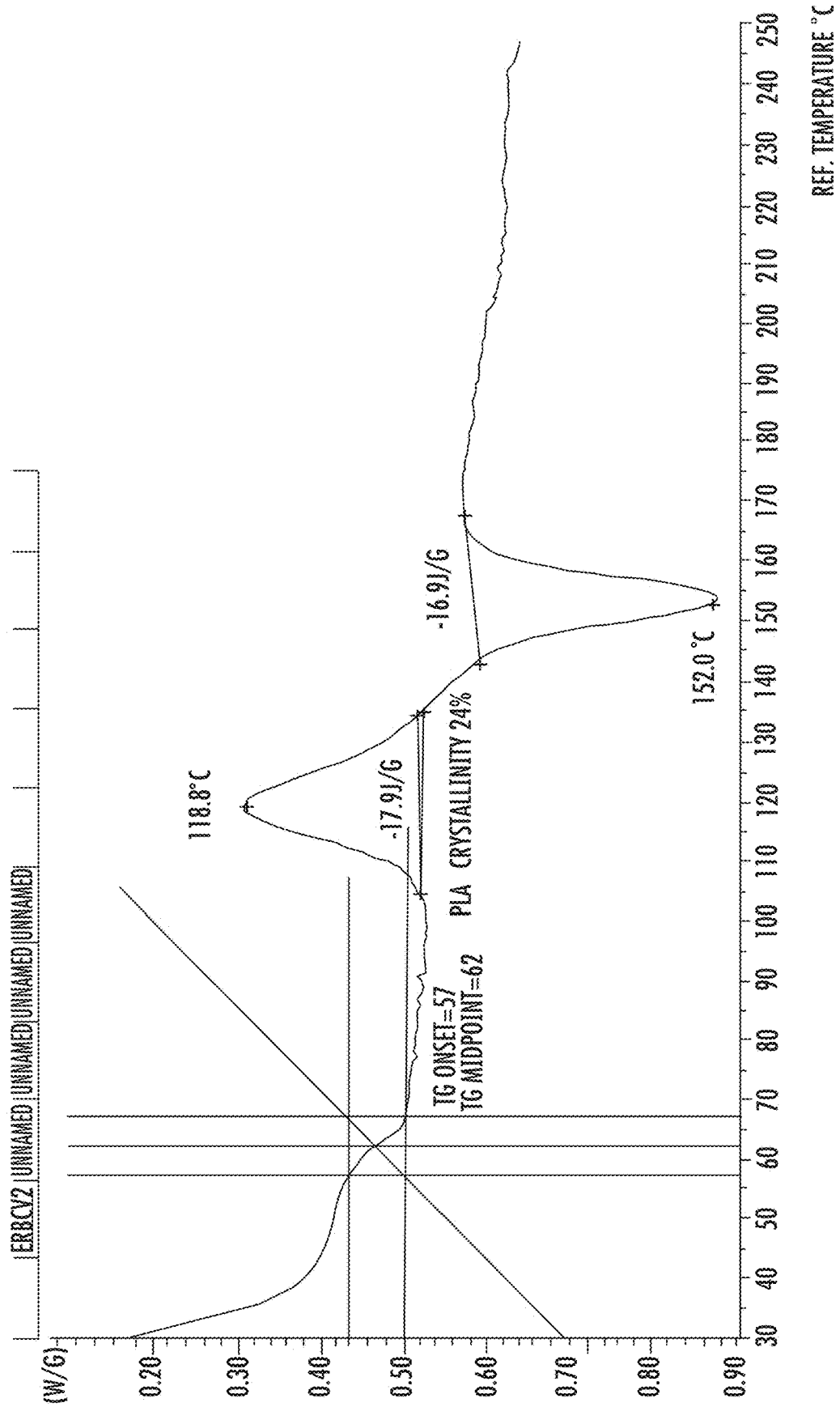
FIG. 4 is a second pass DSC chart corresponding to Example 1.

This was compounded on a Theyson 21 mm twin screw extruder, quenched in a cool water bath and chopped on a Davis Standard rotary pelletizer to uniform finished pellets. The fully compounded pellets were dried in a Conair Regenerating Desiccant dryer to remove moisture down to 100 ppm. The dried pellets were then extruded into a film on a Davis Standard 1 inch single screw extruder using a 2 inch film die head under the following temperature profile.
Zone 1: 360 F
Zone 2: 370 F
Zone 3: 390 F
Zone 4: 400 F
Nozzle: 400 F
Film Die: 400 F
Screw Speed 80%
Pressure 200 PSI This film was cut into samples and HDT measured. Three individual data points were averaged to give an average HDT value of 65.2° C. The first and second pass DSC charts for Example 1 are provided in FIGS. 3 and 4.

Example 2

Figure 5:
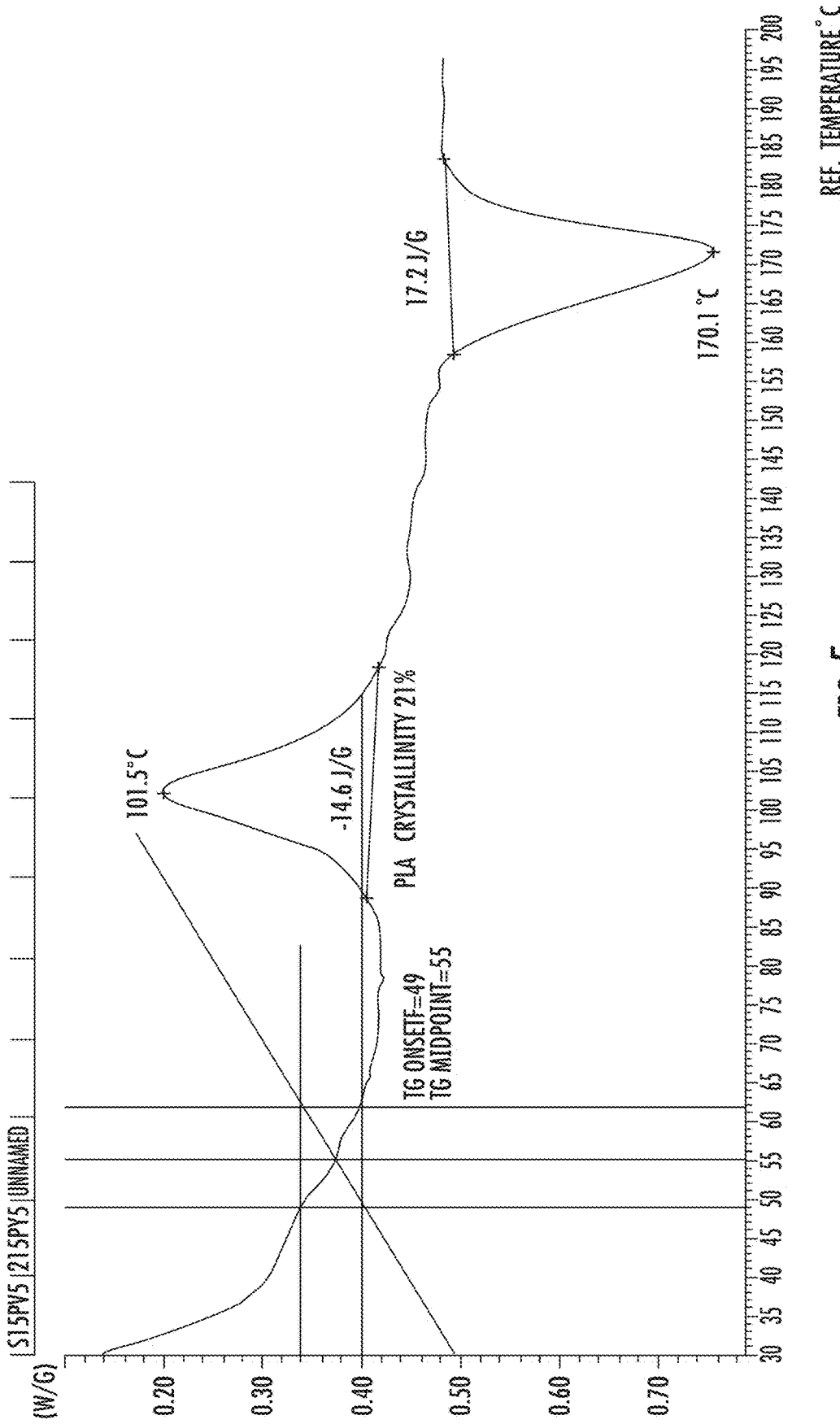
FIG. 5 is a first pass DSC chart corresponding to Example 2.
Figure 6:
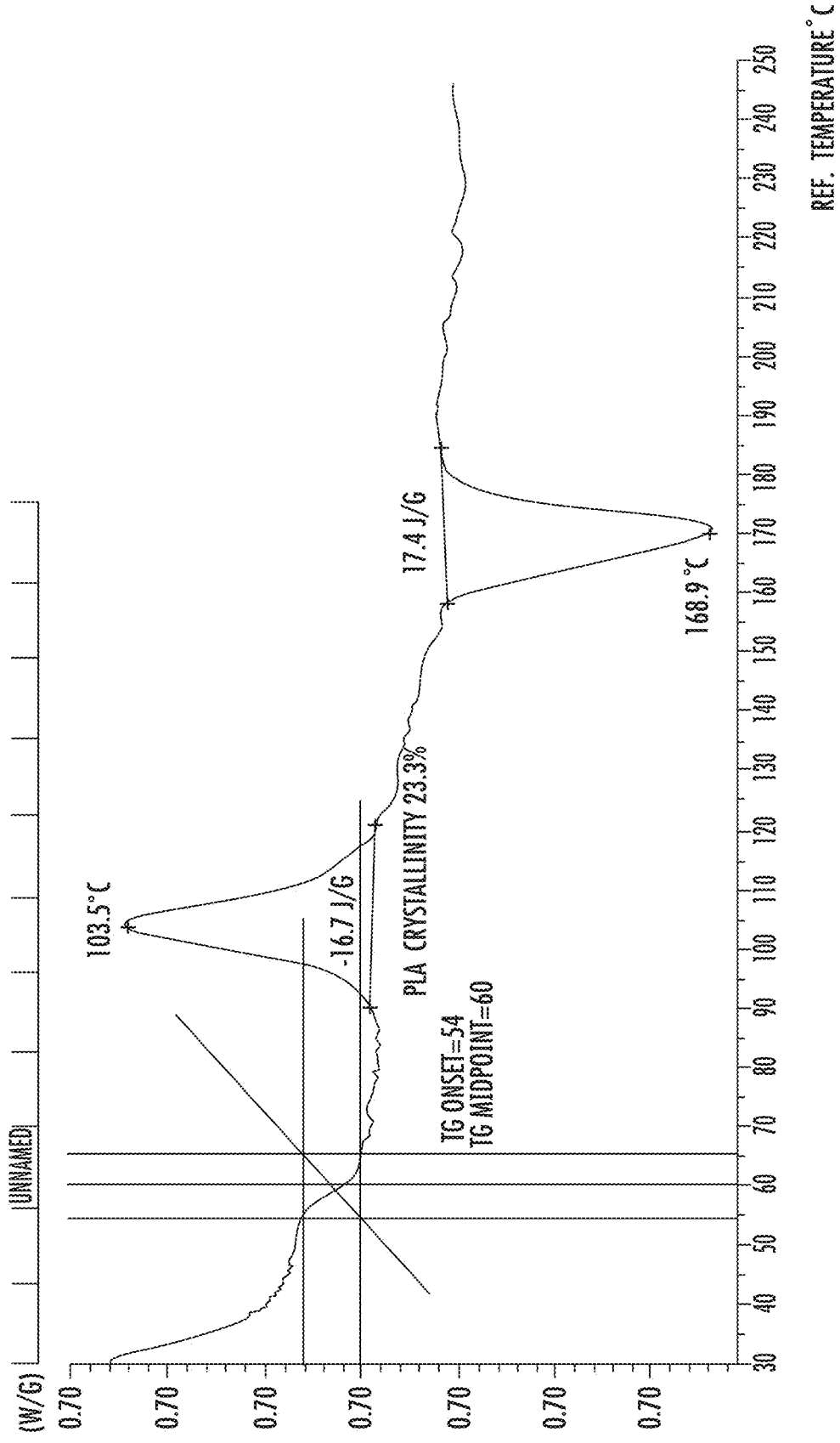
FIG. 6 is a second pass DSC chart corresponding to Example 2.

An extrudable PLA composition was formed comprising the following formula:
93.9 percent PLA
2.5 percent bicomponent fiber (50% PDLA/50% PLLA)
1.2 percent safflower oil
0.2 percent arrowroot
2.0 percent titanium dioxide
0.1 percent shea butter
0.1 percent candelilla wax This formula was compounded on a Theyson 21 mm twin screw extruder at the following setting:
Zone 1: 334 F
Zone 2: 392 F
Zone 3: 339 F
Zone 4: 402 F
Zone 5: 405 F
Die (6): 405 F
RPM 255
Melt Temp 426 F This film was cut into samples and HDT measured. Three individual data points were averaged to give and average HDT value of 62.9° C. The first and second pass DSC charts for Example 2 are provided in FIGS. 5 and 6.

Examples 3-7

Various extrudable polymer compositions are prepared as follows:

| Example | Base Polymer | Amt. (%) | BiCo | BiCo (%) | BCD (%) | Safflower Oil (%) | TiO$_2$ (%) |
|---|---|---|---|---|---|---|---|
| 3 | PLA[1] | 92.4 | 60/40 PET/HDPE | 5.0 | 0.4 | 1.2 | 1.0 |
| 4 | PLA | 92.4 | 50/50 SC/HDPE | 5.0 | 0.4 | 1.2 | 1.0 |
| 5 | PLA | 92.6 | 60/40 SC/HDPE | 5.0 | 0.2 | 1.2 | 1.0 |
| 6 | PLA | 92.7 | 60/40 SC/HDPE | 5.0 | 0.1 | 1.2 | 1.0 |
| 7 | PLA | 92.75 | 60/40 SC/HDPE | 5.0 | 0.05 | 1.2 | 1.0 |

[1]Purac L130 PLA available from Corbion.

Examples 3-7

Hot Mold

| Test | 3 | 4 | 5 | 6 | 7 |
|---|---|---|---|---|---|
| HDT (° C.) | 114.9 | 112 | 110.8 | 122.2 | 120.3 |
| Vicat Softening Pt (° C.) | 164.7 | 163.9 | 162.1 | 164 | 163.2 |
| Flex Modulus | 524052.8 | 52106.7 | 509443.8 | 52260 | 519181.2 |
| Peak Stress | 10556 | 10505 | 10447 | 10603 | 10636 |
| MFI | 14.8 | 22.3 | 17.3 | 17.2 | 19.8 |
| Modulus (PSI) | 295316.9 | 414058 | 332033.6 | 304680.9 | 30736.1 |
| Yield Stress (PSI) | 6352.8 | 8378.2 | 6464.4 | 6437.5 | 6567.2 |
| Elongation at Yield (%) | 2.0 | 1.5 | 1.7 | 1.5 | 1.6 |
| Break Stress (PSI) | 5081.6 | 5053.9 | 5155.2 | 5108.8 | 5180.3 |
| Elongation at Break (%) | 29.5 | 40.8 | 59.4 | 57.6 | 59.6 |
| Izod Impact Resistance (J/m) | 61.6 | 164.9 | 105 | 129.7 | 139.6 |

Examples 3-7

Cold Mold

| Test | 3 | 4 | 5 | 6 | 7 |
|---|---|---|---|---|---|
| HDT (° C.) | 52.4 | 52.4 | 51.4 | 51.8 | 51.6 |
| Vicat Softening Pt (° C.) | 61.6 | 60.9 | 60.8 | 60.9 | 61.0 |
| Flex Modulus | 446557.7 | 447814.9 | 442526.1 | 447664.3 | 453051.7 |
| Peak Stress | 9374 | 9311 | 9199 | 9212 | 9447 |
| MFI | 14.8 | 22.3 | 17.3 | 17.2 | 19.8 |
| Modulus (PSI) | 375618.5 | 363195.8 | 223033.9 | 225476.7 | 22904.7 |
| Yield Stress (PSI) | 8046.1 | 7581.9 | 7180.9 | 7270.8 | 7523.9 |
| Elongation at Yield (%) | 2.0 | 1.3 | 3.2 | 3.3 | 3.3 |
| Break Stress (PSI) | 5034.2 | 4899.4 | 3696.7 | 4205.2 | 4252.3 |
| Elongation at Break (%) | 37.7 | 64.8 | 86.2 | 77.8 | 75.1 |
| Izod Impact Resistance (J/m) | 54.6 | 56.6 | 55.6 | 53.5 | 48.0 |

Examples 8-9

| Example | Based on HDPE or PLA Polymer | Amt. (%) | BiCo | BiCo (%) | TiO$_2$ (%) |
|---|---|---|---|---|---|
| 8 | HDPE[2] | 94.0 | 60% PET/ 40% HDPE | 5 | 1 |
| 9 | HDPE/ PLA[3] | 15% HDPE/ 79% PLA | 60% PET/ 40% HDPE | 5 | 1 |

[2]Bio-HDPE available from Breschem
[3]Purac L175 available from Corbion

Examples 8-9

Hot Mold

| Test | 8 | 9 |
|---|---|---|
| HDT (Celsius) | 70.7 | 81 |
| Vicat Softening Temp (Celsius) | 121.1 | 146.2 |
| Flex Modulus (PSI) | 137569.5 | 490631.9 |
| Peak Stress (PSI) | 3210 | 10244 |

-continued

| Test | 8 | 9 |
| --- | --- | --- |
| MFI | 26 | 4.7 |
| Modulus (PSI) | 122224.2 | 326615.3 |
| Yield Stress (PSI) | 3499.7 | 7433.4 |
| Elongation at Yield (%) | 11.9 | 2.5 |
| Break Stress (PSI) | 1892.1 | 7322.8 |
| Elongation at Break (%) | 86.4 | 3.2 |
| Izod impact (J/m) | 33.3 | 70.8 |

Examples 8-9

Cold Mold

| Test | 8 | 9 |
| --- | --- | --- |
| HDT (Celsius) | 60.8 | 54.4 |
| Vicat Softening Temp (Celsius) | 121 | 66.8 |
| Flex Modulus (PSI) | 121947.7 | 378750.3 |
| Peak Stress (PSI) | 2963 | 9767.3 |
| MFI | 26 | 4.7 |
| Modulus (PSI) | 112538.6 | 281467.6 |
| Yield Stress (PSI) | 3299.3 | 7471 |
| Elongation at Yield (%) | 11.9 | 3.3 |
| Break Stress (PSI) | 1623.3 | 7393.7 |
| Elongation at Break (%) | 439.8 | 3.8 |
| Izod impact (J/m) | 34.6 | 50.9 |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed:

1. An extrudable polymer composition comprising:
a) a base polymer; and
b) a bicomponent fiber comprising a low melt temperature component selected from the group consisting of high density polyethylene (HDPE) and polylactic acid (PLA) and a high melt temperature component selected from the group consisting of PET, 100% PDLA, 100% PLLA or a 50/50 blend of 100% PDLA and 100% PLLA, and nylon wherein the base polymer has a melt temperature of about 20° C. to 40° C. lower than this high melt temperature component of the bicomponent fiber.

2. The extrudable polymer composition according to claim 1, wherein the low melt temperature component is bioHDPE.

3. The extrudable polymer composition according to claim 2, wherein the high melt temperature component is stereocomplex PLA.

4. The extrudable polymer composition according to claim 3, further comprising one or more components comprising cyclodextrin, nanofibers, a natural oil, fatty acid, fatty acid ester, wax or waxy ester, a crystallinity agent, a starch-based rheology agent and/or a gloss agent.

5. The extrudable polymer composition of claim 4, wherein the natural oil is selected from the group consisting of lard, beef tallow, fish oil, coffee oil, coconut oil, soy bean oil, safflower oil, tung oil, tall oil, calendula, rapeseed oil, peanut oil, linseed oil, sesame oil, grape seed oil, olive oil, jojoba oil, dehydrated castor oil, tallow oil, sunflower oil, cottonseed oil, corn oil, canola oil, orange oil, and mixtures thereof.

6. The extrudable polymer composition of claim 4, wherein the nanofibers are derived from fibers of silica or cellulose.

7. The extrudable polymer composition of claim 4, wherein the crystallinity agent is selected from the group consisting of mica, kaolin, clay, talc, calcium carbonate, aluminum oxide and mixtures thereof.

8. The extrudable polymer composition of claim 4, wherein the moisture level is less than about 0.02% of water.

9. The extrudable polymer composition of claim 1, further comprising an additive selected from the group consisting of additional plasticizers, impact modifiers, additional fiber reinforcement, antioxidants, antimicrobials, fillers, UV stabilizers, colorants, glass transition temperature modifiers, melt temperature modifiers and heat deflection temperature modifiers.

10. The extrudable polymer composition of claim 1, wherein the composition has a heat deflection temperature of greater than about 52° C. and a melt temperature between about 153° C. and about 230° C.

11. An article of manufacture formed from the extrudable polymer composition of claim 4.

12. The article of manufacture of claim 11, wherein the article of manufacture is selected from the group consisting of a bottle, lid, cap, closure, container, package and canister.

13. The article of manufacture of claim 11, wherein article of manufacture is a container.

14. The extrudable polymer composition of claim 1, wherein the bicomponent fiber comprises about 0.1% to about 10% by weight of the extrudable polymer composition.

* * * * *